United States Patent
Roberts et al.

(10) Patent No.: US 12,129,761 B2
(45) Date of Patent: Oct. 29, 2024

(54) AIRCRAFT TURBOMACHINE CASING AND METHOD OF MANUFACTURING SAME

(71) Applicants: SAFRAN AIRCRAFT ENGINES, Paris (FR); SAFRAN AEROSPACE COMPOSITES, Rochester, NH (US)

(72) Inventors: Meredith Roberts, Moissy-Cramayel (FR); Chris Anderson, Moissy-Cramayel (FR); Nicolas François Paul Broussais-Colella, Moissy-Cramayel (FR); Ambroise Nicolas Marie Malfroy, Moissy-Cramayel (FR); Foster Alexander Maxwell, Moissy-Cramayel (FR); Paul Myslinski, Moissy-Cramayel (FR); Adrienne Retiveau-Leca, Moissy-Cramayel (FR)

(73) Assignees: SAFRAN AIRCRAFT ENGINES, Paris (FR); SAFRAN AEROSPACE COMPOSITES, Rochester, NH (US)

( * ) Notice: Subject to any disclaimer, the term of this patent is extended or adjusted under 35 U.S.C. 154(b) by 316 days.

(21) Appl. No.: 17/795,511

(22) PCT Filed: Jan. 26, 2021

(86) PCT No.: PCT/FR2021/050136
§ 371 (c)(1),
(2) Date: Jul. 26, 2022

(87) PCT Pub. No.: WO2021/152251
PCT Pub. Date: Aug. 5, 2021

(65) Prior Publication Data
US 2023/0075984 A1    Mar. 9, 2023

(30) Foreign Application Priority Data
Jan. 29, 2020   (FR) ..................... 2000866

(51) Int. Cl.
*F01D 11/12* (2006.01)
*B05C 5/02* (2006.01)
(Continued)

(52) U.S. Cl.
CPC .......... *F01D 11/122* (2013.01); *B05C 5/0216* (2013.01); *B05C 9/06* (2013.01);
(Continued)

(58) Field of Classification Search
CPC ........... F05D 2230/31; F05D 2300/603; F05D 2220/30; F05D 2240/14; F05D 2300/614;
(Continued)

(56) References Cited

U.S. PATENT DOCUMENTS

2019/0047016 A1*   2/2019  Mathon .................. B05C 11/02

FOREIGN PATENT DOCUMENTS

| EP | 3 310 495 A1 | 4/2018 |
| FR | 3 048 018 A1 | 8/2017 |

(Continued)

OTHER PUBLICATIONS

International Search Report mailed May 4, 2021, issued in corresponding International Application No. PCT/FR2021/050136, filed Jan. 26, 2021, 6 pages.

(Continued)

*Primary Examiner* — Vishal I Patel
(74) *Attorney, Agent, or Firm* — CHRISTENSEN O'CONNOR JOHNSON KINDNESS PLLC

(57) ABSTRACT

A casing of an aircraft turbomachine includes an annular shell extending around an axis A and made of a composite material having fibers that which are woven and embedded in a resin. An annular layer made of abradable material extends inside the shell, around axis A and is obtained by spreading and polymerizing a paste. Support panels extend (Continued)

around axis A and are interposed between the shell and the abradable layer.

15 Claims, 7 Drawing Sheets

(51) Int. Cl.
| | |
|---|---|
| B05C 9/06 | (2006.01) |
| B05C 11/02 | (2006.01) |
| B05C 11/10 | (2006.01) |
| B05C 17/10 | (2006.01) |
| B05D 1/40 | (2006.01) |
| B05D 3/12 | (2006.01) |
| B05D 7/22 | (2006.01) |

(52) U.S. Cl.
CPC ........ *B05C 11/025* (2013.01); *B05C 11/1036* (2013.01); *B05C 17/10* (2013.01); *B05D 1/40* (2013.01); *B05D 3/12* (2013.01); *B05D 7/22* (2013.01); *F05D 2230/31* (2013.01)

(58) Field of Classification Search
CPC .... B05D 7/22; B05D 3/12; B05D 1/40; B05C 17/10; B05C 11/1036; B05C 11/025; B05C 9/06; B05C 5/0216; F01D 11/122
See application file for complete search history.

(56) References Cited

FOREIGN PATENT DOCUMENTS

| | | |
|---|---|---|
| FR | 3 051 828 A1 | 12/2017 |
| FR | 3 074 218 A1 | 5/2019 |

OTHER PUBLICATIONS

Written Opinion mailed May 4, 2021, issued in corresponding International Application No. PCT/FR2021/050136, filed Jan. 26, 2021, 5 pages.

* cited by examiner

AIRCRAFT TURBOMACHINE CASING AND METHOD OF MANUFACTURING SAME

TECHNICAL FIELD OF THE INVENTION

The present invention relates to a casing, in particular for a fan, for an aircraft turbomachine, and to a method for manufacturing same.

TECHNICAL BACKGROUND

The prior art comprises in particular the documents FR-A1-2 997 725, FR-A1-2 997 726, FR-A1-3 005 100, FR-A1-3 048 018, FR-A1-3 051 828, EP-A1-3 310 495 and FR-A1-3 060 7438.

FIG. 1 is a partial representation of a fan of an aircraft turbomachine.

In a conventional way, a turbomachine comprises from upstream to downstream, i.e. in the direction of flow of the gas flows, a fan, one or more compressors, a combustion chamber, one or more turbines, and a nozzle for the ejection of the combustion gases leaving the turbine or the turbines.

The fan 1 comprises an impeller 2 which is surrounded by a fan casing 3, also referred to as retention casing because of its function of retaining the vanes in case of vanes breakage or in case of debris entering the fan.

As can be seen in FIG. 2, the fan casing 3 typically comprises an annular envelope 9 of axis of revolution A that extends around the fan vanes 2 of the turbomachine. This envelope comprises an annular attachment flange 3', 3" at each of its axial ends. These flanges 3', 3" are used to attach the casing 3 to annular walls of the nacelle of the turbomachine.

FIG. 3 is a schematic cross-section illustrating a fan casing 3 according to the prior art.

The fan casing 3 is connected upstream to an air inlet sleeve 5 and downstream to an intermediate casing shroud 6. The casing also carries upstream acoustic panels 7 and downstream acoustic panels 8. The fan casing 3 further comprises an annular layer 4 of abradable material, positioned on an internal annular surface of the envelope, between the upstream panels 7 and the downstream panels 8.

In addition to the retention function, the fan casing 3 is also designed to:
  ensure the continuity of the aerodynamic duct by means of the annular layer of abradable material;
  ensure a mechanical continuity (of forces and moments) between the air inlet sleeve 5 and the intermediate casing shroud 6;
  allow the attachment of the panels 7, 8 and the layer 4,
  allow the attachment of equipment and supports known per se;
  meet the specifications of fire and leakage regulations;
  allow a continuity of the electric current for the lightning resistance, etc.

As can be seen in the larger cross-sectional view in FIG. 4, abradable support panels 10 are interposed between the envelope 9 and the layer 4. These panels 10 are generally formed of a sandwich structure comprising a skin 10b covered with a honeycomb layer 10c of the honeycomb type (i.e. with open alveoli). The skin 10b extends between a side of the honeycomb layer 10c and the envelope 9, and a glue layer 10a extends between the other side of the honeycomb layer 10c and the layer 4.

The panels 10 are glued to an internal surface of the envelope 9 and the abradable layer 4 is usually obtained by spreading and polymerizing a paste composed of a mixture of previously mixed components.

The layer 4 is for example formed from a two-component densifying epoxy resin filled with glass microbeads. The abradable layer 4 is used to ensure a minimum clearance between the summits of the fan vanes 2 and the casing 3. During the first rotation of the fan, these vanes 2 erode the layer and adjust the clearance between the summits of the vanes and the layer 4, in a way that is optimized for a given engine. The efficiency of the engine is thus ensured by adapting the track of this layer to each clearance of vanes for each engine.

In the current technique, the abradable layer 4 has a relatively large thickness, up to 8 mm. When mixing the components, which are viscous, a special care is taken to limit the porosity due to mixing and outgassing while ensuring excellent mixing of the two components. Once the deposit is made, the polymerization is ensured either at room temperature or in an oven. Porosities often appear after polymerizing and local touch-ups are necessary.

Although the deposition method is optimized in order to reduce the porosities in the abradable layer, some of them still remain due to the outgassing of the material or the deposition method below the visible surface.

For this reason, porosities may be revealed in some engines after running-in during mounting or during acceptance or service tests. In addition, because the material of the abradable layer has a low cohesion, it is susceptible to the local losses, due to underlying porosities, and to cracking.

The present invention proposes a solution to at least some of the problems of the prior art that is simple, effective and economical.

SUMMARY OF THE INVENTION

According to a first embodiment, the invention relates to an aircraft turbomachine casing, this casing comprising:
  an annular envelope extending around an axis A and made of a composite material comprising fibres which are woven and embedded in a resin,
  an annular layer of abradable material extending inside the envelope, around the axis A, and obtained by spreading and polymerizing a paste, and
  support panels extending around the axis A and interposed between the envelope and the abradable layer,
  characterised in that said layer is associated with at least one fibrous reinforcement.

To overcome the problems in service related to the low cohesion of the material, and its sensitivity to pull-outs and cracks, it is proposed to reinforce the latter with one or more types of fibrous reinforcements in order to improve its cohesion.

The casing according to the invention may comprise one or more of the following characteristics, considered independently or in combination with each other:
  reinforcing fibres, having for example a length of between 0.5 and 20 mm, are dispersed in the paste and the abradable layer; to solve the problems of porosity or for large losses of materials (except porosity), the idea is to add fibrous reinforcements in the form of fibres, for example glass, aramid or carbon, during the mixing of the components of the abradable layer, depending on the impact on the density of the material; this allows to reinforce the resin in all the directions with the stresses in traction, compression and shear;
  reinforcing laps or fabrics are embedded in the abradable layer or interposed between the layer and the panels;

the panels are separated from each other by clearances filled with said paste, at least some of the laps or fabrics covering these clearances; concerning the problems of cracking, it is thus possible to use in the junction areas of the panels, fibrous reinforcing bands, woven or not, in order to stop the cracking of the abradable layer; these bands can for example be interwoven in order to promote their wetting by the abradable layer;

a layer of foam is interposed between the panels and the abradable layer; to overcome both mechanical strength and porosity problems, it has also been considered to replace most of the thickness of the abradable layer by a layer of foam (glued for example with an adhesive or via the abradable layer on the panels); this alternative allows to reduce the quantity of abradable paste used and thus to facilitate the degassing of the material, which drastically decreases the number of porosities; in addition, the foam can absorb the deformations undergone by shearing in the panel junction areas; associated with fibres as mentioned above, this foam also allows to increase the cohesive strength of the material, the wetting with the substrate, to reduce the number of porosities and to reduce the costs of the abradable track; the remaining abradable layer allows to ensure the function of abradability of the support ensuring the clearances with the summits of the vanes.

The present invention also relates to an aircraft turbomachine, comprising a casing as described above, in particular which extends around a fan of this turbomachine.

The present invention also relates to a method for manufacturing a casing as described above, wherein it comprises the steps of:

gluing the panels to an internal annular surface of the envelope, preparing the paste and spreading on an internal annular surface, for example panels, to form the abradable layer, this layer being associated with at least one fibrous reinforcement.

The method may comprise one or more of the following characteristics or steps, considered independently or in combination with each other:

reinforcing fibres are mixed into the paste before it is spread, or reinforcing laps or fabrics are arranged on the internal annular surface of the panels before the paste is spread;

the paste is spread on the internal annular surface of a foam layer previously glued on an internal annular surface of the panels;

the paste is spread in a plurality of sub-steps, each sub-step comprising depositing paste in the form of a ball on the internal annular surface, spreading the paste over the surface so as to make its thickness uniform, this paste extending over a predetermined angular segment of the surface, and then making a chamfer at the level of an edge of this paste so that the paste is intended to be deposited and spread over an adjacent angular segment can cover this chamfered edge.

According to a second embodiment, the invention relates to an aircraft turbomachine casing, this casing comprising:

an annular envelope extending around an axis A and made of a composite material comprising fibres which are woven and embedded in a resin, an annular layer of abradable material extending inside the envelope, around the axis A, and obtained by spreading and polymerizing a paste, and support panels extending around the axis A and interposed between the envelope and the abradable layer, characterised in that the abradable layer is deposited on an internal annular surface of a foam layer which is itself deposited on an internal annular surface of the panels.

The casing according to the invention may comprise one or more of the following characteristics, considered independently or in combination with each other:

the foam layer has a thickness of between 1 and 7 mm, and preferably between 3 and 5 mm;

the sum of the thicknesses of the abradable layer and the foam layer is less than or equal to 10 mm, and preferably less than or equal to 8 mm;

the foam layer is made of thermoplastic material;

the foam layer has a density of between 20 and 100 Kg/m$^3$;

the abradable layer is associated with at least one fibrous reinforcement selected from reinforcing fibres and reinforcing laps or fabrics;

the panels are separated from each other by clearances filled with said paste, at least some of the laps or fabrics covering these clearances.

The characteristics of both embodiments of the invention can naturally be combined.

The present invention also relates to an aircraft turbomachine, comprising a casing as described above, in particular which extends around a fan of this turbomachine.

The present invention also relates to a method for manufacturing a casing as discussed above, wherein it comprises the steps of:

gluing the panels to an internal annular surface of the envelope, gluing the foam layer to an internal annular surface of the panels, and preparing the paste and spreading on an internal annular surface of the foam layer.

Reinforcing fibres can be mixed into the paste before it is spread. Alternatively or additionally, reinforcing laps or fabrics can be arranged on the internal annular surface before the paste is spread on this surface.

According to a third embodiment, the present invention relates to a method for manufacturing an aircraft turbomachine casing, this casing comprising:

an annular envelope extending around an axis A and made of a composite material comprising fibres which are woven and embedded in a resin, an annular layer of abradable material extending inside the envelope, and support panels extending around the axis A and interposed between the envelope and the abradable layer, characterised in that it comprises the steps of:

a) preparing a paste by mixing at least two components, b) depositing the paste on an internal annular surface of the panels, c) spreading the paste by means of at least one roll extending substantially parallel to the axis A and intended to roll on guide annulus arranged on either side of the panels or of the envelope, coaxially thereto, so as to form an angular sector of the abradable layer which extends over a predetermined angle about the axis A, d) forming a chamfer at a circumferential end of the sector thus formed, e) and repeating the steps a) to d) until a plurality of consecutive angular sectors of the abradable layer are formed and cover the entire internal surface of the panels, the sectors formed in the step e) each comprising a circumferential end covering the chamfered circumferential end of the previously deposited sector.

The method according to the invention allows the abradable layer to be formed as consecutive sectors whose edges adjacent to the circumferential ends are chamfered and cover each other. This way of forming the abradable layer allows to limit the appearance of porosities and defects in the layer.

In a particular case of implementation of the method, the method allowed to reduce by 80% the duration of the manufacturing of the casing and in particular by 50% the duration devoted to the touch-up of the casing at the end of the method.

The method according to the invention may comprise one or more of the following steps or characteristics, considered independently or in combination with each other:
- the paste is based on epoxy resin, and is preferably filled with, for example, glass microbeads;
- the mixing is done in the step a) by incorporating the components into a pot of a machine that comprises at least one rotating mixing element along two non-parallel axes of rotation;
- the rotating element rotates around said axes at a speed of between 400 and 1000 rpm, and preferably of between 600 and 900 rpm, and for a time of between 50 and 200 seconds, and preferably of between 80 and 120 seconds;
- said pot comprises a bottom extractable from the inside to the outside of the pot, for example by means of a piston, so as to facilitate the removal of the paste from this pot;
- the paste deposited in the step b) has a mass of between 400 and 2600 g;
- the casing is positioned so that the axis A is substantially horizontal during the steps b) to e);
- the casing is rotated about the axis A during the step c) or during each step c);
- the paste is deposited in the step b) in the form of a string or a ball;
- the abradable layer has a thickness of between 3 and 10 mm, and preferably between 5 and 8 mm;
- the method also comprises, between the steps b) and c) and/or between the steps c) and d), a step i) of scraping the paste or the sector by means of a blade;
- a plastic film is interposed between said at least one roll and the paste during the step c);
- said at least one roll used in the step c) has a non-cylindrical profiled shape;
- the guide annulus in the step c) are solicited axially towards each other and into abutment against the panels by elastic bands extending between the guide annulus;
- the chamfer formed in the step d) extends along the entire axial dimension of the sector and is oriented at approximately 45° to a normal to the internal surface of this sector;
- the method comprises a final step g) of finishing machining the internal surface of the abradable layer, during which the casing is positioned so that its axis A is substantially vertical;
- the method comprises a preliminary step of gluing the panels to an internal annular surface of the envelope.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

In the following description, the invention is applied to a fan casing 3. However, the invention is not limited to this type of casing and can be applied to other casings of a turbomachine.

The casing 3 to which the method according to the invention is applied has a generally annular shape about an axis A. This casing 3 comprises:
- an annular envelope 9 extending around the axis A and made of a composite material comprising fibres which are woven and embedded in a resin, and
- an annular layer 4 of abradable material arranged inside the envelope 9.

Support panels 10 are interposed between the layer 4 and the envelope 9 and have a sandwich structure, as mentioned above. In particular, they comprise a honeycomb layer of the honeycomb type which comprises open alveoli as opposed to the closed alveoli or cells of a foam for example.

To avoid the problems discussed above, the layer 4 may be associated with at least one fibrous reinforcement, which may be of one or more types selected, for example, from fibres, fibre laps or fabrics, etc. A fabric is formed of fibres woven together as opposed to a lap which is formed of non-woven fibres.

Figure 5:
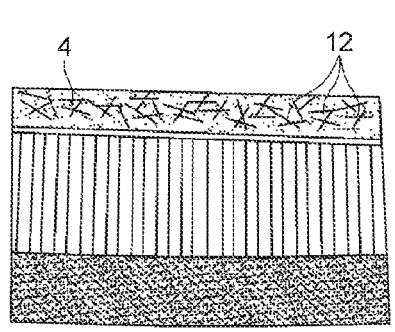
FIG. 5 is a schematic cross-sectional view of a casing according to the invention.

In the example shown in FIG. 5, reinforcing fibres 12, for example having a length of between 0.5 and 20 mm, are dispersed in the abradable layer 4. These include glass, aramid or carbon fibres.

Figure 7:
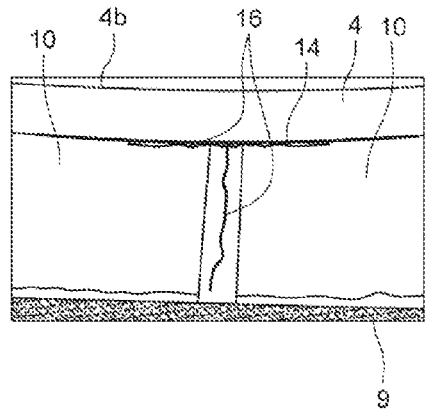
FIG. 7 is a schematic cross-sectional view of a casing according to the invention, and shows the limitation of the propagation of the crack.

In the example shown in FIG. 7, reinforcing laps or fabrics 14 are embedded in the abradable layer 4 or interposed between the layer 4 and the panels 10. Laps or fabrics 14 can be used in combination with fibres 12 mixed with the abradable paste.

Figure 6:
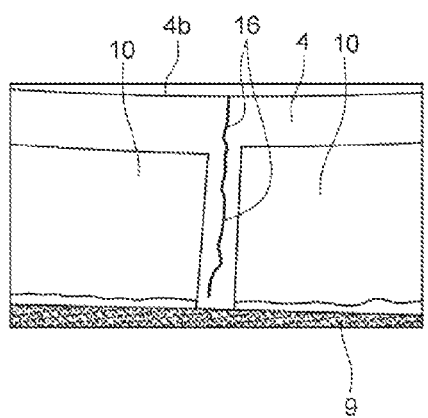
FIG. 6 is a schematic cross-sectional view of a casing according to the prior art, and shows the propagation of a crack.

In the illustrated case where the panels 10 are separated from each other by clearances J filled with the paste of the layer, at least some of the laps or fabrics 14 cover these clearances. This prevents cracks 16 that would appear in these clearances J from propagating to the free surface 4b of the abradable layer 4 (FIGS. 6 and 7).

Figure 8:
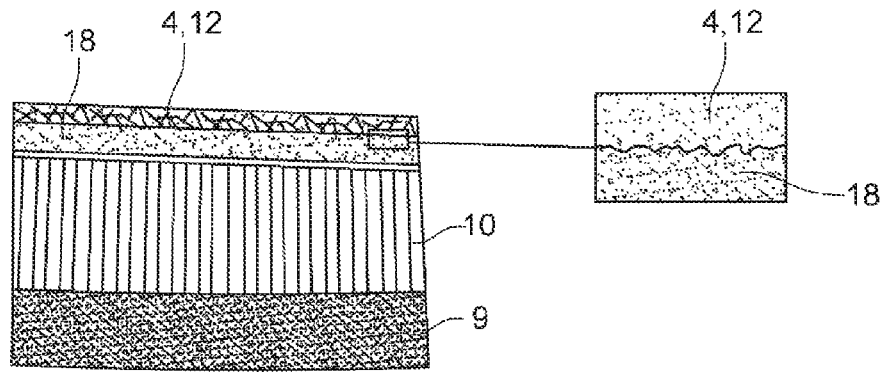
FIG. 8 is a view similar to FIG. 6 and illustrates an alternative embodiment or another embodiment of the invention.

The fibrous reinforcements of FIGS. 5 and 7 may be used alone or in combination with a foam layer 18 as shown in FIG. 8. This layer 18 is interposed between the panels 10 and the abradable layer 4 and provides several advantages. In particular, it allows to reduce the thickness of the layer 4 and thus the quantity of material of the paste to be spread to make this layer. It also reduces the risks of cracking and problems associated with the use of a thick layer 4.

Alternatively, and according to a second embodiment of the invention, the foam layer 18 could be used without fibrous reinforcement of the abradable layer 4.

The foam layer 18 has for example a thickness of between 1 and 7 mm, and preferably between 3 and 5 mm. The sum of the thicknesses of the abradable layer 4 and of the foam layer 18 is preferably less than or equal to 10 mm, and preferably less than or equal to 8 mm.

The foam layer 18 is for example made of thermoplastic material. Its density can be of between 20 and 100 $Kg/m^3$;

The casing 3 according to the invention can be manufactured as follows:
  gluing the panels 10 to an internal annular surface of the envelope 9,
  preparing the paste and spreading on an internal annular surface, for example of the panels 10, this layer being associated with at least one fibrous reinforcement.

In the embodiment shown in FIG. 5, the reinforcing fibres 12 are mixed into the paste prior to its spreading.

In the embodiment shown in FIG. 7, the reinforcing laps or fabrics 14 are arranged on the internal annular surface of the panels 10 prior to spreading the paste.

Finally, in the alternative or second embodiment of the invention of FIG. 8, the paste is spread on the internal annular surface of a foam layer 18 previously glued to an internal annular surface of the panels 10.

Figure 9:
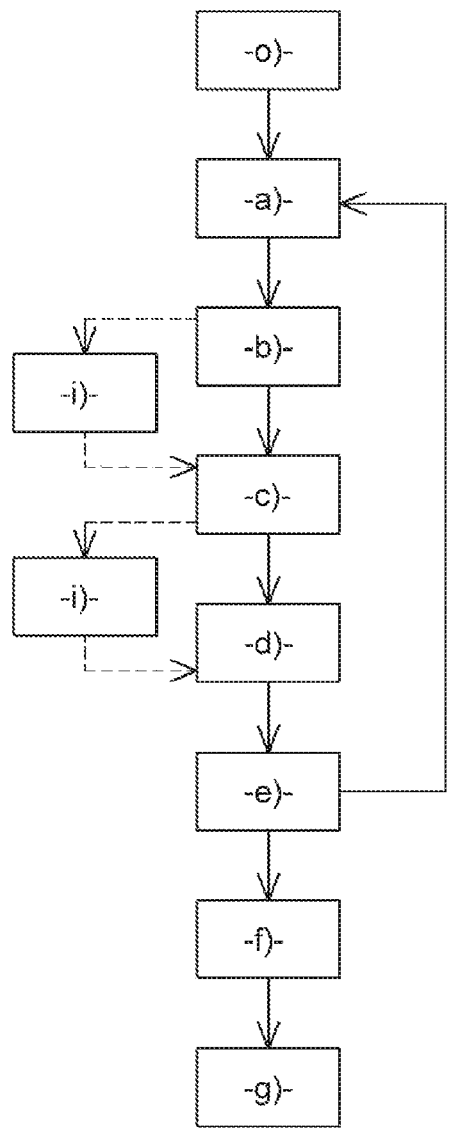
FIG. 9 is a flowchart showing steps of a manufacturing method according to the invention.

FIG. 9 is a flowchart or block diagram illustrating the various steps of a method according to the invention for manufacturing an aircraft turbomachine casing.

Figure 10:
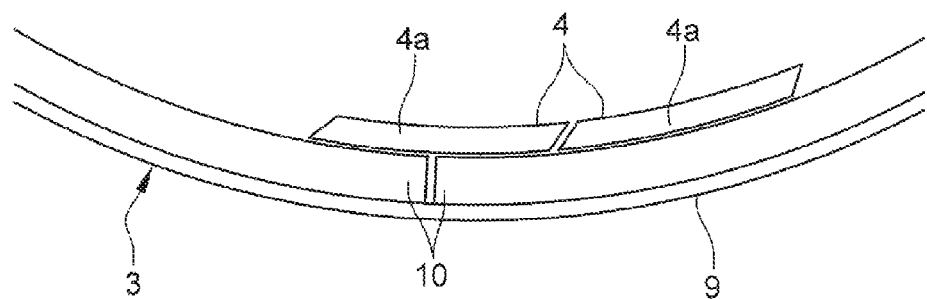
FIG. 10 is a partial schematic cross-sectional view of an aircraft turbomachine casing.

As discussed above and illustrated in FIG. 10, this casing comprises:
  an annular envelope 9 extending around an axis A (not visible) and made of a composite material comprising fibres which are woven and embedded in a resin,
  an annular layer 4 of abradable material extending inside the envelope, and
  support panels 10 extending around the axis A and interposed between the envelope 9 and the abradable layer 4.

The particularity of this casing 3 is that its abradable layer 4 is formed by a plurality of angular sectors 4a arranged circumferentially end to end (around the axis A) one after another.

The method according to the invention in FIG. 9 comprises several steps, some of which are optional. This is in particular the case for the steps o), g) and i).

As will be described in more detail in the following and illustrated in the drawings, the method can be implemented manually (FIGS. 12a-12e and 13) but it is advantageous to implement it by means of an at least partially automated installation (FIGS. 14 to 17).

The method may comprise a preliminary step o) of gluing the panels 10 to the internal annular surface of the envelope 3.

The method essentially comprises four steps a), b), c) and d), which are repeated (step e)) as many times as necessary:
  a) preparing a paste 20 by mixing at least two components,
  b) depositing the paste 20 on an internal annular surface 10d of the panels 10,
  c) spreading the paste 20 by means of at least one roll 24 extending substantially parallel to the axis A and intended to roll on guide annulus 26 arranged on either side of the panels or of the envelope, coaxially thereto, so as to form an angular sector 4a of the abradable layer which extends over a predetermined angle about the axis A, and
  d) forming a chamfer 28 at a circumferential end of the sector 4a thus formed.

During the step e), the steps a) to d) are repeated until a plurality of consecutive angular sectors 4a of the abradable layer 4 are formed and cover the entire internal surface of the panels 10. The sectors formed in the step e) each comprise a circumferential end covering the chamfered circumferential end of the previously deposited sector (see FIG. 10).

The casing 3 is preferably positioned so that the axis A is substantially horizontal during the steps b) to e).

The paste is preferably based on epoxy resin, and is preferably filled with, for example, glass microbeads. It is obtained by mixing at least two components.

The step a) of preparing the paste 20 is preferably made by means of a mixing machine. It is therefore not done manually, as this tends to promote the appearance of air bubbles in the paste which, due to its viscosity, is found in the abradable layer after polymerization.

Figure 11:
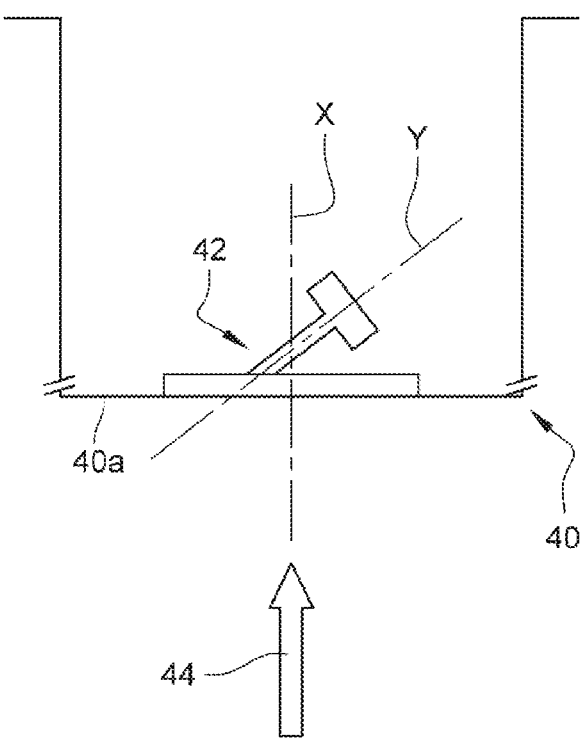
FIG. 11 is a very schematic view of a component mixing machine for the preparation of a paste.

FIG. 11 illustrates such a mixing machine in a very schematic way. In the step a), the components are incorporated into the pot 40 of the machine, which comprises at least one rotating mixing element 42 along two non-parallel axes of rotation Y and Y.

This machine is for example the one marketed by the company FlackTek under the name Speed Mixer® DAC3000.

The rotating element 42 of the machine rotates about the axes X, Y at a speed of between 400 and 1000 rpm, and preferably between 600 and 900 rpm, and for a time of between 50 and 200 seconds, and preferably between 80 and 120 seconds.

The pot 40 in which the paste is mixed preferably has a bottom 40a that is removable and extractable by axial translation from the inside to the outside of the pot. This displacement (see arrow 44) can be done by means of a piston, for example, which rests on the lower surface of the bottom 40a. When the bottom 40a is removed from the pot 40, its upper surface can be scraped off to remove all of the paste and facilitate its placement in the next step.

The paste deposited in the step b) and intended to form a sector can have a mass of between 400 and 2600 g.

Figure 12:
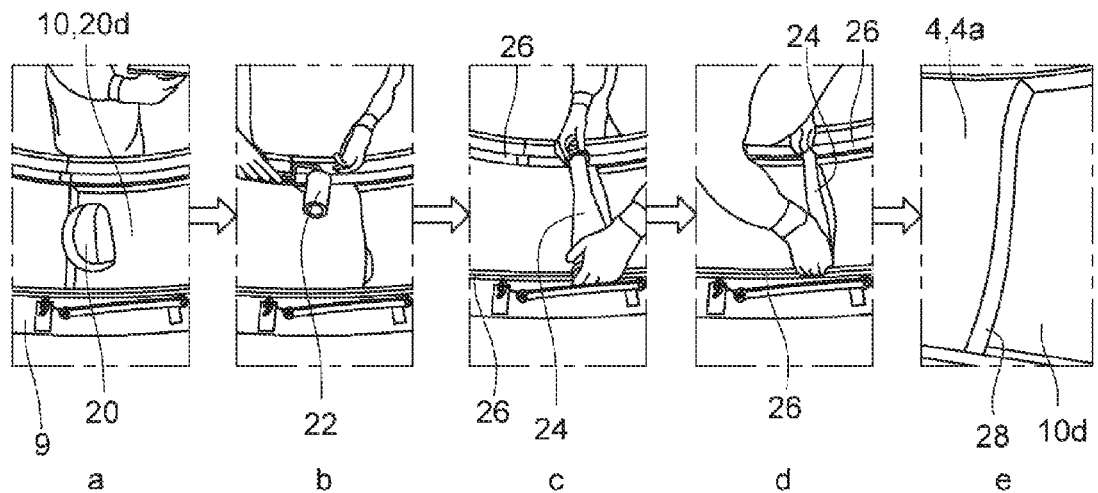
FIGS. 12a to 12e are schematic views of a casing and of an operator spreading a paste on the casing in order to make an abradable layer.

FIGS. 12a to 12e illustrate the steps of the method done manually. FIG. 12a illustrates the step b) of depositing the paste 20 in the form of a ball or a string on the internal annular surface 10d of the panels 10.

FIGS. 12b and 12c illustrate the step c) of spreading the paste 20 on the surface 10d by means of a roll 22 at first which allows to distribute the paste (FIG. 11b), then by means of a profiled roll 24 secondly which allows to rest on the guide annulus 26 of calibrated thickness, so as to uniform the thickness of the paste (FIG. 12c).

Figure 13:
FIG. 13 is a very schematic cross-sectional view of an abradable layer being spread.

The paste 20 then extends over a predetermined angular segment of the surface 10d, and a chamfer 28 is made at the level of a circumferential edge of this paste in the step d) so that the paste intended to be deposited and spread over an adjacent angular segment can cover this chamfered edge during the step e) (FIGS. 12d, 12e and 13).

Figure 14:
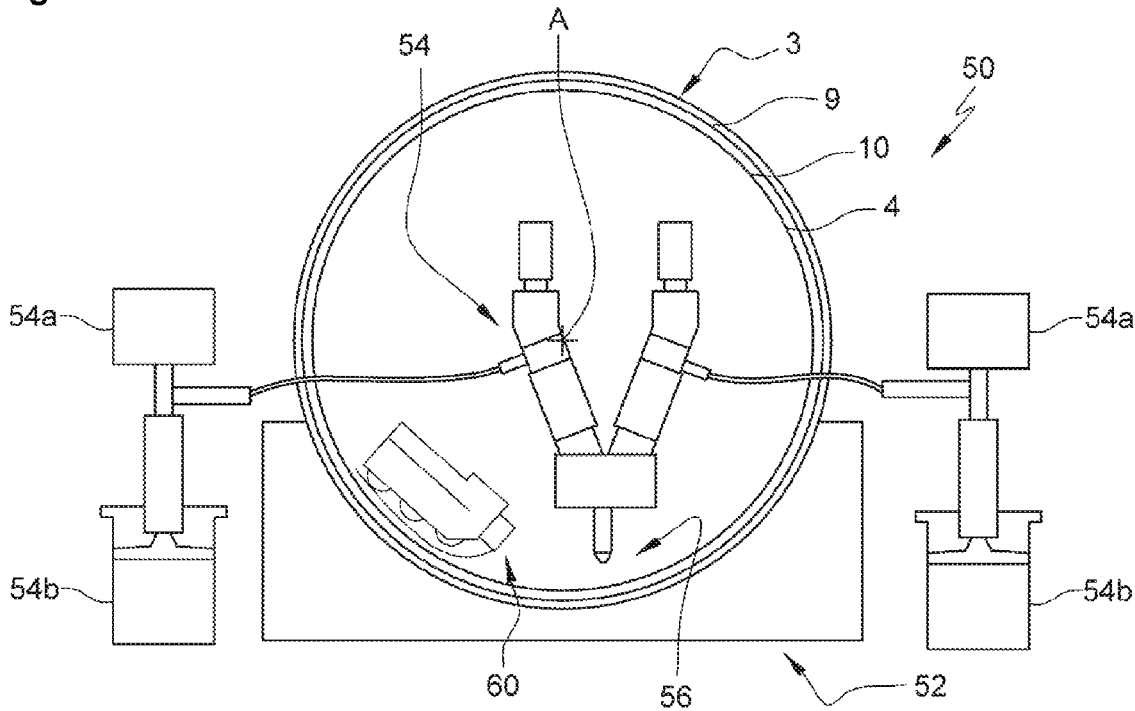
FIG. 14 is a schematic view of an installation for manufacturing a turbomachine casing.

FIG. 14 and following illustrate the steps of the method done by an automated installation.

The installation 50 in FIG. 14 comprises in particular:
- an equipment 52 for rotating the casing 3 about the axis A during the step c) or each step c),
- an equipment 54 for preparing the paste 20 based on the mixture described above,
- an equipment 56 for depositing the paste 20 in the form of a string or a ball on the internal surface of the panels 10,
- an optional equipment 58 for scraping the paste 20 and for preforming it before spreading,
- an equipment 60 for spreading the paste with rolls 24 to form each sector 4a of the abradable layer,
- an optional equipment 62 for unwinding a plastic film 62 and for inserting this plastic film 20 between the paste and the spreading rolls 24 of the equipment 60,
- an optional equipment 64 for scraping the internal surface of each sector 4a after spreading, and
- an equipment 66 for cutting the circumferential end of each sector in order to form the chamfer 28.

The equipment 52 may comprise an electric motor connected by sprockets to a drive wheel of the casing 3 about the axis A.

The equipment 54 preferably comprises a machine 40 of the type described in the foregoing in connection with FIG. 11. As shown in FIG. 14, this machine is connected by pumps 54a to reservoirs 54b for storing the components to be mixed to form the paste.

The equipment 56 comprises a head for depositing the paste, this head can be movable along one or more axes to optimize the deposition of the paste on the internal surface of the panels 10.

Figure 15:
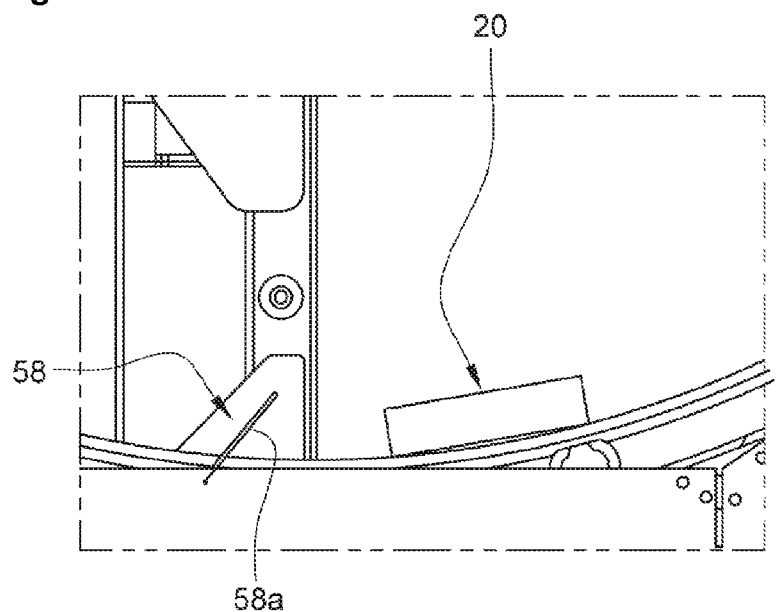
FIG. 15 is a larger scale schematic view of a portion of the installation in FIG. 14 and illustrates steps of a manufacturing method according to the invention.

The equipment 58 shown in FIG. 15 comprises at least one blade 58a which is intended to come into contact with the paste 20 in the form of ball or string to compress it and force its application and its spreading on the panels and give it a preform facilitating its spreading by the rolls 24.

Figure 16:
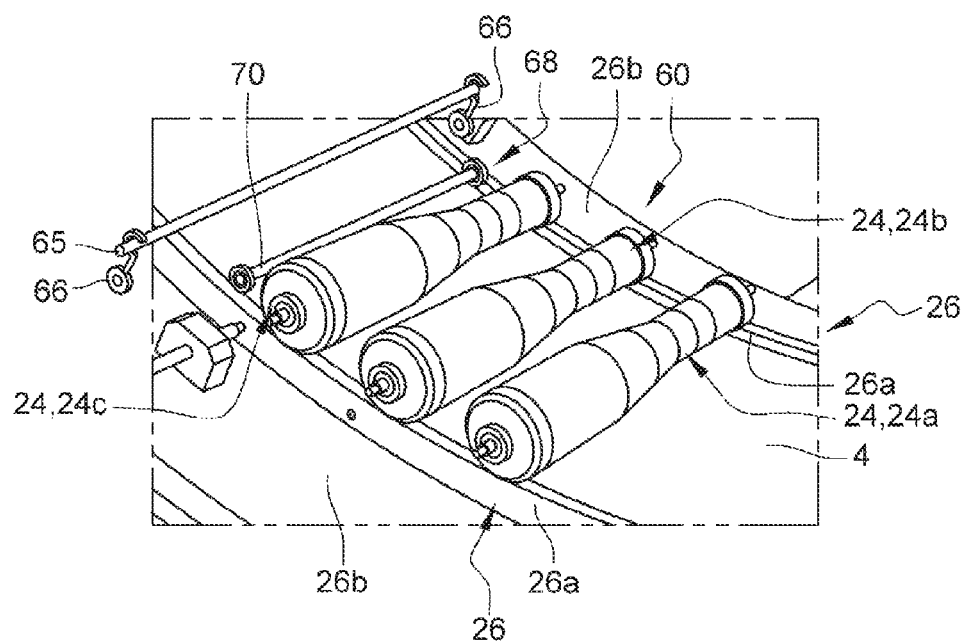
FIG. 16 is a larger scale schematic view of a portion of the installation of FIG. 14 and illustrates further steps of a manufacturing method according to the invention.

The spreading rolls 24 are visible in FIG. 16 and comprise, for example, a first plating roll 24a, a second preforming roll 24b and a third finishing roll 24c. As mentioned above, these rolls 24 roll on guide annulus 26 mounted on each side of the panels 10.

Figure 1:
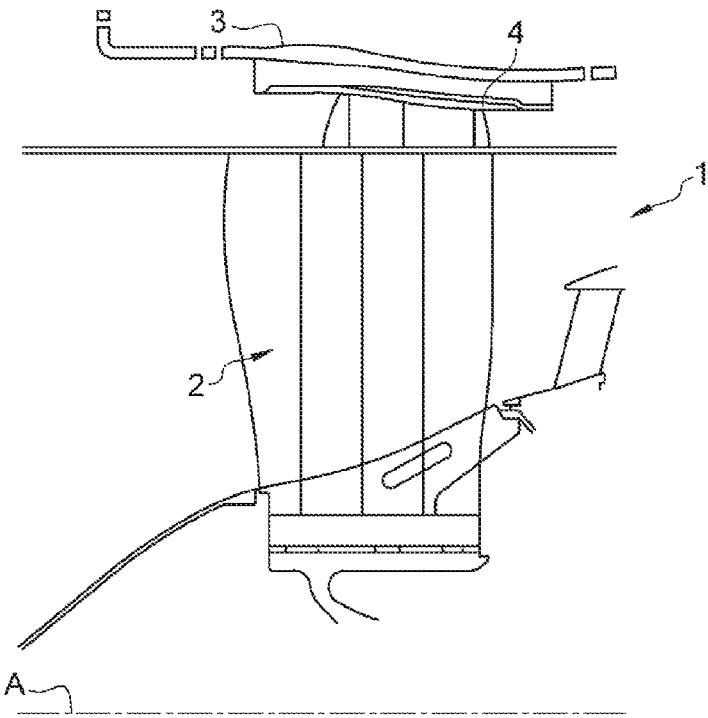
FIG. 1 already discussed shows a partial cross-sectional view of a fan of an aircraft turbomachine according to the prior art.
Figure 2:
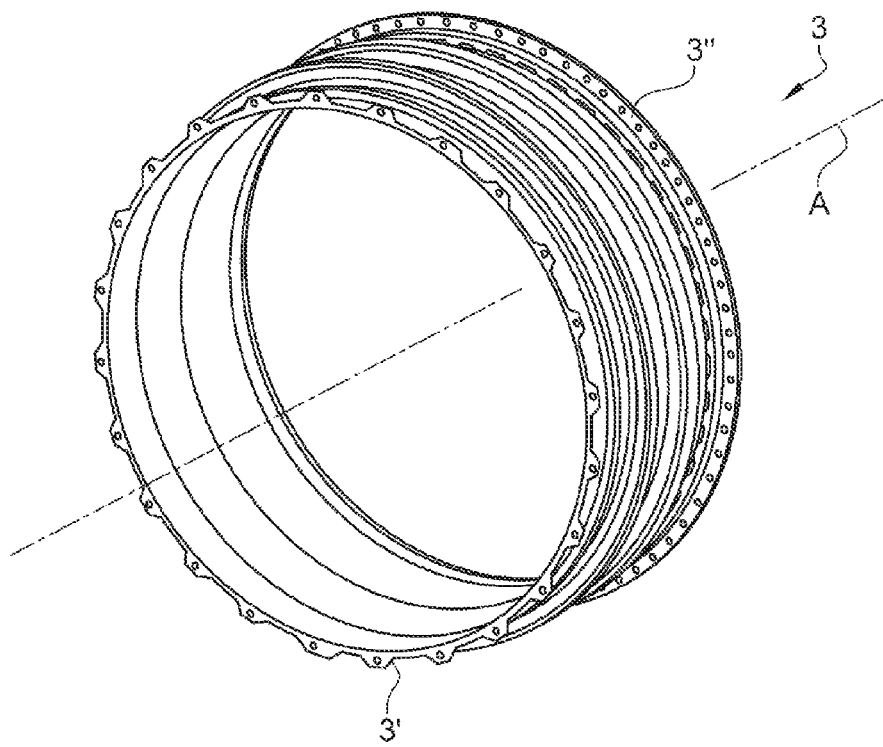
FIG. 2 already discussed shows a perspective view of a fan casing according to the prior art.
Figure 3:
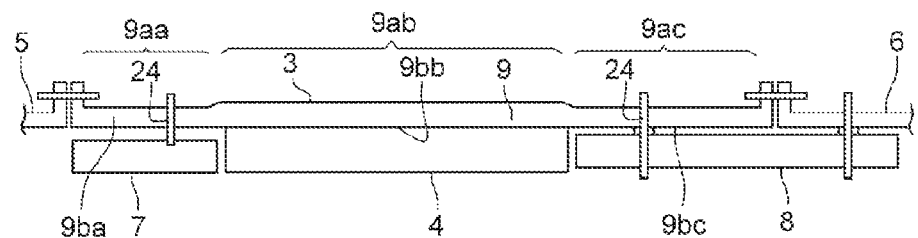
FIG. 3 shows a schematic partial cross-section of a fan casing according to the prior art.
Figure 4:
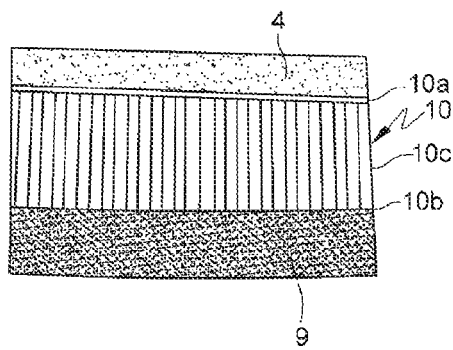
FIG. 4 is a schematic cross-sectional view of a casing according to the prior art.

The rolls 24 are preferably profiled and non-cylindrical, as seen in the drawings, so as to give the internal surface of the sectors 4a a desired non-cylindrical shape visible in FIG. 1.

For example, the rolls 24 are made of plastic material. The roll 24a allows to obtain a paste thickness increased by 1 mm compared to the final desired measure. The roll 24b allows to obtain a paste thickness increased by 0.5 mm compared to the final desired measure. The roll 24c allows to obtain a thickness of the paste at the desired final measure.

The guide annulus 26 are preferably solicited axially toward each other and into abutment against the panels 10 by elastic bands 65 extending between the guide annulus 26. In one particular example, the guide annulus 26 located on each side of the casing 3 comprises a first annular ring 26a for rolling the rolls 24, which has an internal diameter D1, and a second annular ring 26b for holding the first ring 26a which has an internal diameter D2 which is larger than D1.

The second ring 26b rests on the first ring 26a which is interposed between the second ring and the panels 10. The second ring 26b carries hooks 66 for attaching first ends of the elastic bands 65, the opposite ends of which are attached to hooks 66 carried by the second ring 26b located on the side opposite the casing 3. The second rings 26b are thus axially solicited toward each other by these tensile solicited elastic bands 65, and thus axially hold the first rings 26a on either side of the panels 10.

The rings 26a and 26b are for example made of carbon fibre.

Figure 17:
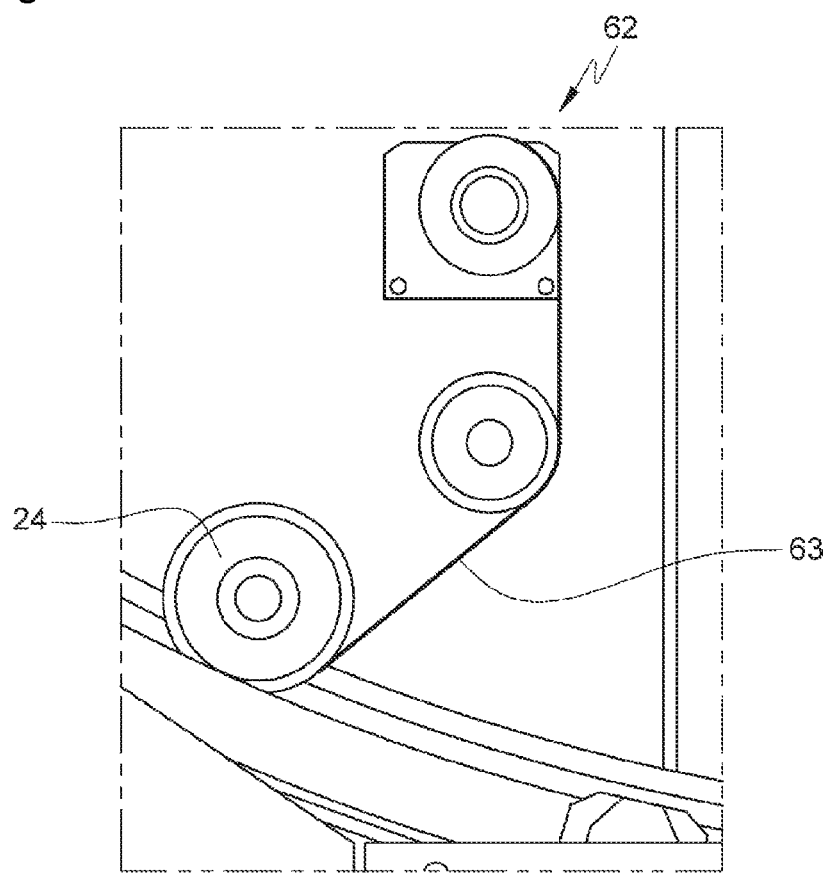
FIG. 17 is a larger scale schematic view of a portion of the installation in FIG. 14 and illustrates another step in a manufacturing method according to the invention.

The purpose of the equipment 62 shown in FIG. 17 is to interpose a plastic film 62 between the paste 20 and the rolls 24, this plastic film preventing the direct contact and the risk of adhesion between the paste and the spreading rolls 24.

The roll 24a can then be used to ensure the positioning of the film and press it onto the paste. The roll 24b can ensure the deformation of the film and profile the paste.

The equipment 64 is similar to that of FIG. 15 and may comprise at least one blade 58a which is intended to come into contact with the already formed sector 4a to perfect the surface condition of its internal surface.

The equipment 68 visible in FIG. 16 may comprise a cutting roll or discs 70 used to separate the layer 4 from each side of the panels 10 and facilitate the demoulding after polymerization. They can also be used to cut the circumferential end of each sector 4a in order to form the chamfer 28 visible in FIG. 13, when this cutting is not done manually.

The abradable layer 4 has a thickness of between 3 and 10 mm, and preferably between 5 and 8 mm. The chamfer 28 formed in the step d) extends across the entire axial dimension of the sector 4a and is oriented at approximately 45° to a normal to the internal surface of that sector.

During the next step f), the polymerization of the paste takes place. It can take place at room temperature or in an oven.

Finally, the method can comprise a final step g) of finishing machining the internal surface of the abradable layer 4, during which the casing 3 is positioned so that its axis A is substantially vertical.

The invention claimed is:

1. A method for manufacturing an aircraft turbomachine casing, this casing comprising:
   an annular envelope extending around an axis A and made of a composite material comprising fibers which are woven and embedded in a resin,
   an annular layer of abradable material extending inside the envelope, and
   support panels extending around the axis A and interposed between the envelope and the abradable layer,
   wherein the method comprises the steps of:
   a) preparing a paste by mixing at least two components,
   b) depositing the paste on an internal annular surface of the panels,
   c) spreading the paste by means of at least one roll extending parallel to the axis A and configured to roll on guide annulus arranged on either side of the panels or of the envelope, coaxially thereto, so as to form an angular sector of the abradable layer which extends over a predetermined angle about the axis A, d) forming a chamfer at a circumferential end of the sector thus formed, e) and repeating the steps a) to d) until a plurality of consecutive angular sectors of the abradable layer are formed and cover the entire internal surface of the panels, the sectors formed in the step e) each comprising a circumferential end covering the chamfered circumferential end of the previously deposited sector.

2. The method according to claim 1, wherein the paste is based on epoxy resin.

3. The method according to claim 1, wherein the mixing is done in the step a) by incorporating the components into a pot of a machine that comprises at least one rotating mixing element along two non-parallel axes (X, Y) of rotation.

4. The method according to claim 3, wherein the rotating element rotates about said axes at a speed of between 4400 and 1000 rpm and for a time of between 50 and 200 seconds.

5. The method according to claim 4, wherein said pot comprises a bottom extractable from the inside to the outside of the pot so as to facilitate the removal of the paste from the pot.

6. The method according to claim 1, wherein the paste deposited in the step b) has a mass of between 400 and 2600 g.

7. The method according to claim 1, wherein the casing is positioned so that the axis A is horizontal during the steps b) to e).

8. The method according to claim 7, wherein the casing is rotated about the axis A during the step c) or during each step c).

9. The method according to claim 1, wherein the paste is deposited in the step b) in the form of a string or a ball.

10. The method according to claim 1, wherein the abradable layer has a thickness of between 3 and 10 mm.

11. The method according to claim 1, further comprising between the steps b) and c) and/or between the steps c) and d), a step i) of scraping the paste or the sector by means of a blade.

12. The method according to claim 1, wherein a plastic film is interposed between said at least one roll and the paste during the step c).

13. The method according to claim 1, wherein said at least one roll used in the step c) has a non-cylindrical profiled shape.

14. The method according to claim 1, wherein the guide annulus in the step c) are solicited axially towards each other and into abutment against the panels by elastic bands extending between the guide annulus.

15. The method according to claim 1, wherein the chamfer formed in the step d) extends along the entire axial dimension of the sector and is oriented at 45° to a normal to the internal surface of that sector.

* * * * *